(12) United States Patent
Cho et al.

(10) Patent No.: US 8,602,627 B2
(45) Date of Patent: Dec. 10, 2013

(54) BACKLIGHT ASSEMBLY AND DISPLAY APPARATUS HAVING THE SAME

(75) Inventors: Joo Woan Cho, Asan-si (KR); Seongsik Choi, Seoul (KR); YoungWoo Lee, Suwon-si (KR)

(73) Assignee: Samsung Display Co., Ltd. (KR)

( * ) Notice: Subject to any disclaimer, the term of this patent is extended or adjusted under 35 U.S.C. 154(b) by 312 days.

(21) Appl. No.: 13/192,370

(22) Filed: Jul. 27, 2011

(65) Prior Publication Data

US 2012/0081925 A1 Apr. 5, 2012

(30) Foreign Application Priority Data

Oct. 1, 2010 (KR) .................. 10-2010-0096072

(51) Int. Cl.
 *F21V 7/04* (2006.01)
(52) U.S. Cl.
 USPC ........................................ 362/613; 362/611
(58) Field of Classification Search
 USPC ............... 362/611, 613, 225, 602, 606, 608
 See application file for complete search history.

(56) References Cited

U.S. PATENT DOCUMENTS

| | | |
|---|---|---|
| 5,016,141 A | 5/1991 | Lorig et al. |
| 2007/0165425 A1 | 7/2007 | Sakamoto et al. |
| 2011/0090422 A1 | 4/2011 | Hamada |
| 2011/0170034 A1 | 7/2011 | Jeong |

FOREIGN PATENT DOCUMENTS

| | | |
|---|---|---|
| EP | 2169458 B1 | 11/2011 |
| JP | 11-298177 | 10/1999 |
| JP | 2001-144476 | 5/2001 |
| KR | 100797438 B1 | 1/2008 |
| WO | 2009118942 A1 | 10/2009 |

*Primary Examiner* — Vip Patel
(74) *Attorney, Agent, or Firm* — Innovation Counsel LLP

(57) ABSTRACT

A display apparatus includes a light source unit, a supporter, a light guide plate, and a display panel. The light source unit includes a substrate and a plurality of light sources disposed on a front surface of the substrate to emit a light. The supporter supports the light source unit. The light guide plate includes a light incident surface facing the front surface of the substrate, to which the light is incident, and a light exiting surface from which the light exits. The display panel receives the light from the light guide plate to display an image.

20 Claims, 8 Drawing Sheets

BACKLIGHT ASSEMBLY AND DISPLAY APPARATUS HAVING THE SAME

CROSS-REFERENCE TO RELATED APPLICATION

This application relies for priority upon Korean Patent Application No. 10-2010-0096072 filed on Oct. 1, 2010, the contents of which are herein incorporated by reference in its entirety.

BACKGROUND

1. Field of Disclosure

The subject matter described herein relates to a backlight assembly and a display apparatus having the backlight assembly.

2. Description of the Related Art

A display apparatus, such as a liquid crystal display or an electrophoretic display, includes a liquid crystal display panel or an electrophoretic display panel to display an image. However, since the liquid crystal display panel or the electrophoretic display panel is not self-emissive, the display apparatus requires a backlight assembly to supply the liquid crystal display panel or the electrophoretic display panel with light.

The backlight assembly includes a plurality of light sources. In some applications, the backlight assembly includes a light emitting diode as the light source, which has properties such as low power consumption, lightweight, and slimness when compared to a cold cathode fluorescent lamp.

SUMMARY

Exemplary embodiments of the subject matter described herein provide a backlight assembly capable of improving heat dissipating property and reducing display defects.

Exemplary embodiments of the subject matter described herein provide a display apparatus having the backlight assembly.

According to the exemplary embodiments, a backlight assembly includes a light source unit, a supporter, a light guide plate, and alternatively a display panel. The light source unit includes a substrate and a plurality of light sources arranged on a front surface of the substrate to emit a light, the supporter supports the light source unit, and the light guide plate includes a light incident surface to which the light is incident and a light exiting surface from which the light exits. The light incident surface of the light guide plate faces the front surface of the substrate The supporter includes a body part making contact with a rear surface of the light source unit, a bottom part extending from a lower portion of the body part in a direction substantially parallel to the light exiting surface, a protruding part disposed on the bottom part and comprising a surface making contact with the substrate, and a cover part coupled to the body part to cover an upper portion of the substrate and press the substrate in a direction in which the bottom part is disposed.

The surface of the protruding part is inclined to the front surface of the substrate. The protruding part is extended in a longitudinal direction of the substrate. In addition, the protruding part is provided in a plural number and the protruding parts are arranged in a longitudinal direction of the substrate.

The cover part includes a first portion making contact with an upper portion of the body part, a second portion extending from the first portion and comprising a surface making contact with the substrate, and a coupling member coupling the first portion to the body part. The coupling member may be a screw, hook, or elastic clip.

The display apparatus of claim may further include a mold frame provided at at least one side of the supporter to support an end of the display panel, and the cover part may be integrally formed with the mold frame. In addition, the display apparatus may further include a bottom chassis to accommodate the light source unit, the supporter, and the light guide plate therein, and the body part, the bottom part, and the protruding part may be integrally formed with the bottom chassis.

According to the above, the display apparatus does not need heat radiation tape, heat radiation grease, an additional screw hole, and thus the assembling process for the display apparatus may become simplified and the manufacturing cost for the display apparatus may be reduced.

BRIEF DESCRIPTION OF THE DRAWINGS

The above and other advantages of the will become readily apparent by reference to the following detailed description when considered in conjunction with the accompanying drawings wherein.

DETAILED DESCRIPTION

Figure 1:
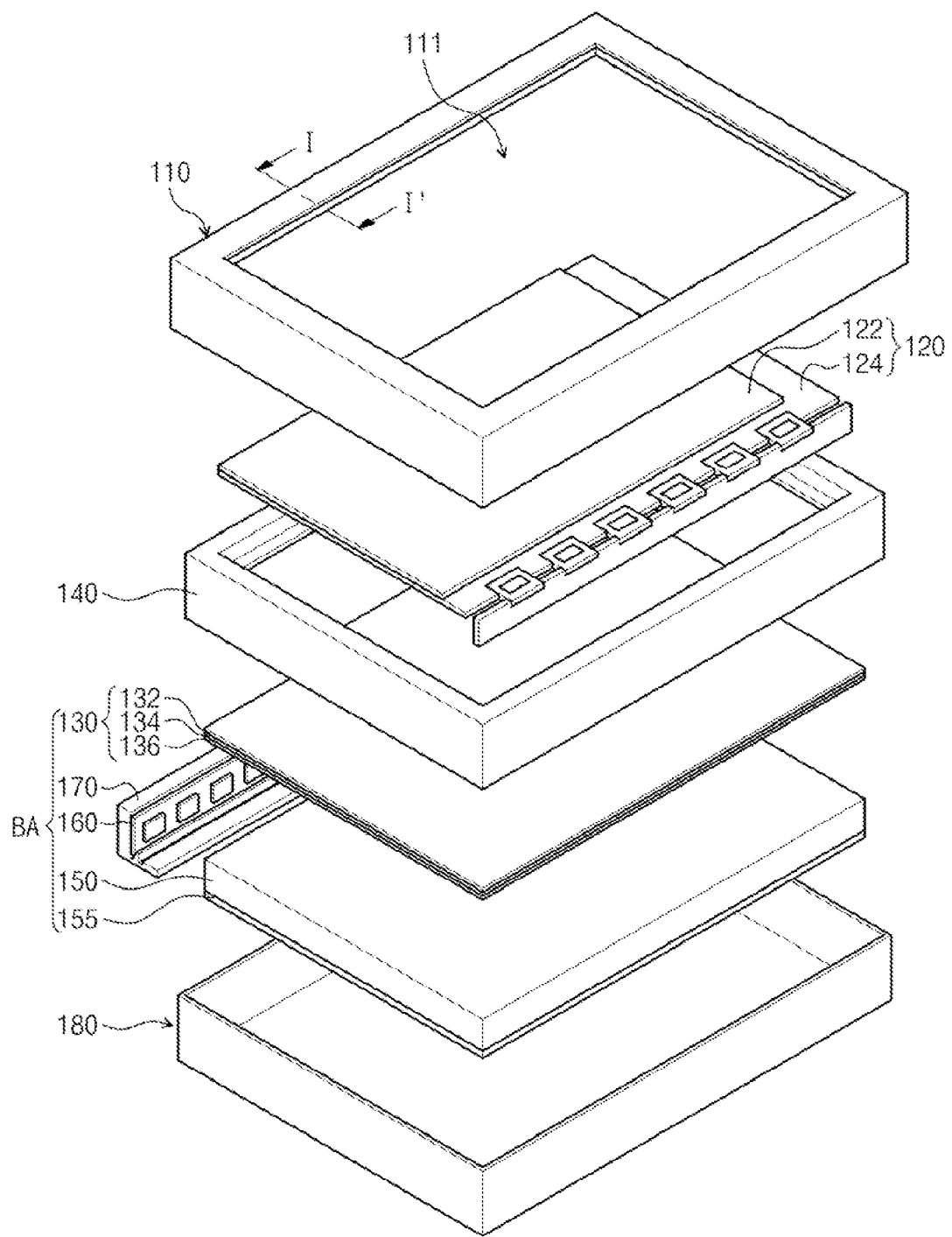
FIG. 1 is an exploded perspective view showing a display apparatus according to a first exemplary embodiment.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the subject matter pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the subject matter will be explained in detail with reference to the accompanying drawings.

Figure 2:
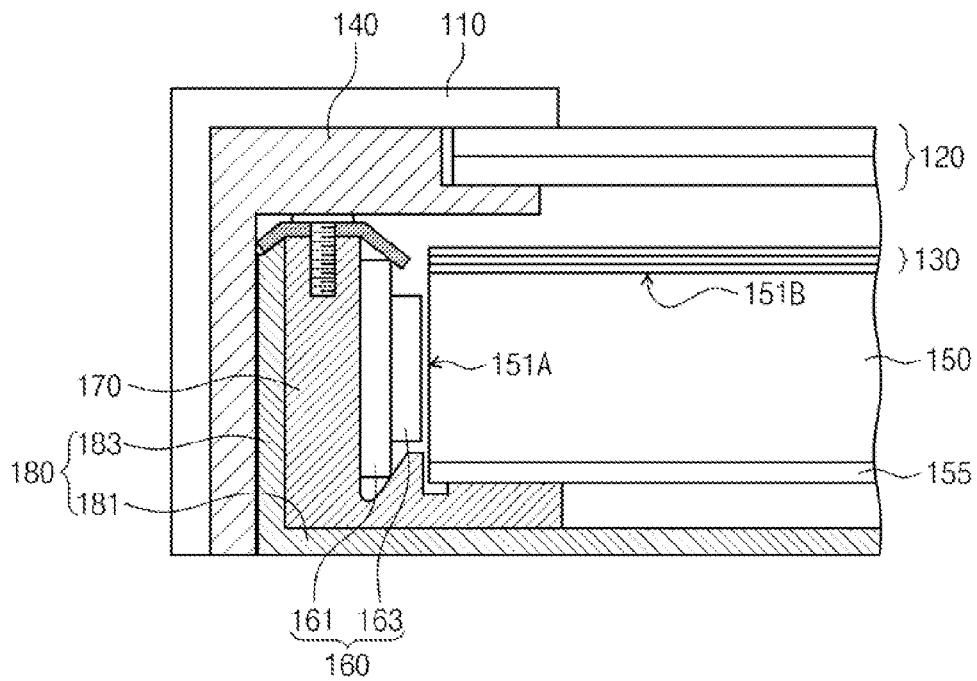
FIG. 2 is a cross-sectional view taken along a line I-I' of FIG. 1.

FIG. 1 is an exploded perspective view showing a display apparatus according to a first exemplary embodiment and FIG. 2 is a cross-sectional view taken along a line I-I' of FIG. 1.

Referring to FIGS. 1 and 2, a display apparatus includes a display panel 120, a mold frame 140, a backlight assembly BA, a bottom chassis 180, and a top chassis 110.

The display panel 120 displays an image. The display panel 120 may be a liquid crystal display panel or an electrophoretic display panel. In the present exemplary embodiment, the liquid crystal display panel will be described as an example for the display panel.

The display panel 120 has a rectangular plate-like shape including a long side and a short side. The display panel 120 includes a first substrate 124, a second substrate 122 facing the first substrate 124, and a liquid crystal layer (not shown) disposed between the first substrate 124 and the second substrate 122.

According to the present exemplary embodiment, the first substrate 124 may include pixel electrodes (not shown) and thin film transistors (not shown) electrically connected to the pixel electrodes in one-to-one correspondence. Each thin film transistor switches a driving signal applied to a corresponding pixel electrode of the pixel electrodes. In addition, the second substrate 122 may include a common electrode (not shown) that forms an electric field together with the pixel electrodes to control arrangement of liquid crystal molecules of the liquid crystal layer. Thus, the display panel 120 may drive the liquid crystal layer and display an image.

The mold frame 140 is provided along an end of the display panel 120 and disposed below the display panel 120 to support the display panel 120. The mold frame 140 has a substantially rectangular ring shape. The mold frame 140 may be provided in singular or plural numbers.

The backlight assembly BA is provided under the display panel 120 to supply a light to the display panel 120. The backlight assembly BA includes a light source part, a light guide plate 150, an optical sheet 130, and a reflective sheet 155. Details of the backlight assembly BA will be described later.

The top chassis 110 is disposed on the display panel 120. The top chassis 110 covers a front end of the display panel 120 and a side surface of the mold frame 140 or a side surface of the bottom chassis 180. The top chassis 111 is provided with a window 111 formed therethrough to expose a display area of the display panel 120.

The bottom chassis 180 is disposed under the backlight assembly BA to accommodate the backlight assembly BA. The bottom chassis 180 may include a bottom portion 181 substantially parallel to a rear surface of the reflective sheet 155 and a sidewall portion 183 upwardly extended from the bottom portion 181. The backlight assembly BA is accommodated in a space defined by the bottom portion 181 and the sidewall portion 183.

Figure 3:
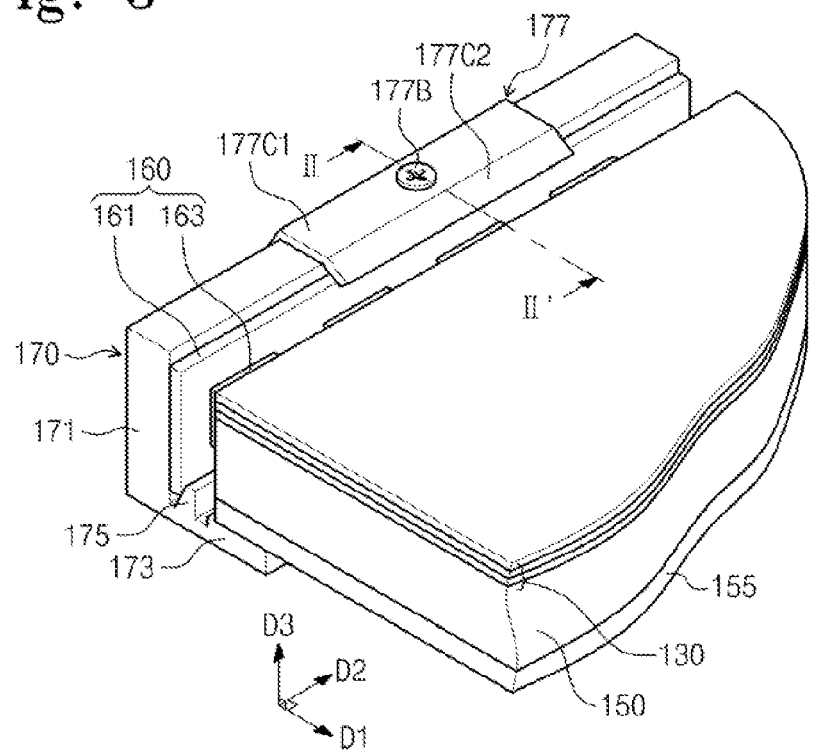
FIG. 3 is a partial perspective view showing a backlight assembly in the display apparatus of FIG. 1.
Figure 4:
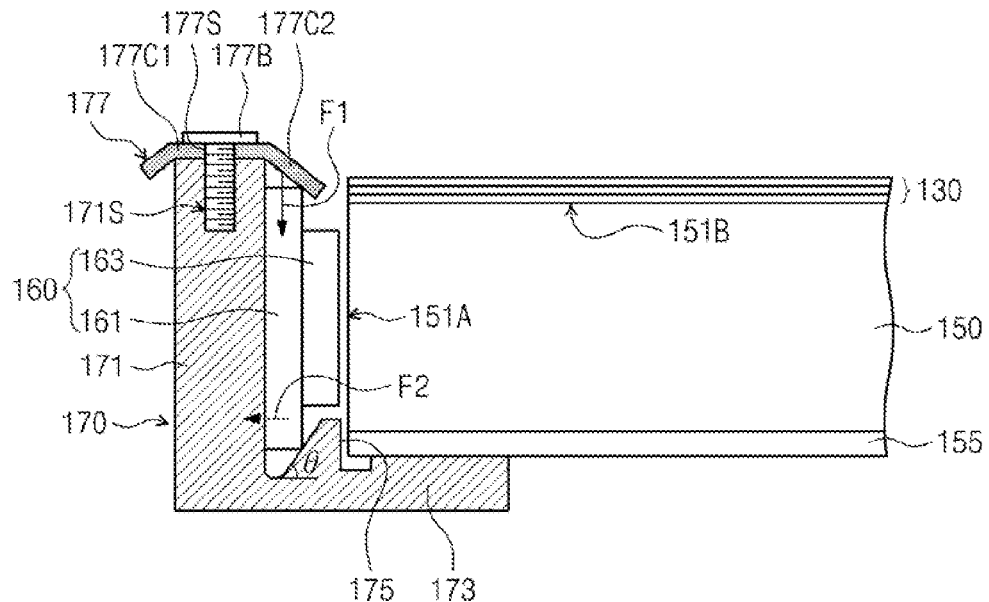
FIG. 4 is a cross-sectional view taken along a line II-II' of FIG. 3.

FIG. 3 is a partial perspective view showing a backlight assembly in the display apparatus of FIG. 1 and FIG. 4 is a cross-sectional view taken along a line II-II' of FIG. 3.

Referring to FIGS. 3 and 4, the backlight assembly BA includes the light source part that emits the light, a light guide plate 150 that guides the light to the display panel 120, the optical sheet 130 that improves the light efficiency of the light, and the reflective sheet 155 that changes a path in which the light travels.

For the convenience of explanation, a direction in which the light emitting from the light source part travels is referred to as a first direction D1, a direction substantially parallel to an upper surface of the bottom chassis 180 and vertical to the first direction D1 is referred to as a second direction D2, and a direction substantially vertical to the first direction D1 and the second direction D2 is referred to as a third direction D3. The third direction D3 is a direction from the reflective sheet 155 to the display panel 120.

The light source part provides the light traveling in the first direction D1 to the light guide plate 150. The light source part includes a light source unit 160 supplying the light to the light guide plate 150 and a supporter 170 supporting the light source unit 160.

The light guide plate 150 has a rectangular plate-like shape and is disposed under the display panel 120. Most wide two surfaces of surfaces forming the light guide plate 150 are positioned parallel to the display panel 120. The light guide plate 150 guides the light to the display panel 120. The light guide plate 150 includes a light incident surface 151A to which the light is incident and a light exiting surface 151B from which the light exits. The light incident surface 151A faces a front face of the light source unit 160. The light emitted from the light source unit 160 is incident inside the light guide plate 150 through the light incident surface 151A. The light exiting surface 151B faces the display panel 120. The light that is incident inside the light guide plate 150 travels to the display panel 120 through the light emitting surface 151B.

In the present exemplary embodiment, the light incident surface 151A and the light exiting surface 151B are connected to each other, but it should not be limited thereto or thereby. For instance, the positions of the light incident surface 151A and the light exiting surface 151B depend on the position of the light source unit 160. In the case that the light source unit 160 is disposed under the light guide plate 150 and the display panel 120, the light incident surface 151A and the light exiting surface 151B are positioned to be parallel to each other. In addition, in the present exemplary embodiment, one light incident surface 151A has been shown, but the number of the light incident surfaces should not be limited thereto. That is, the light source unit 160 may be provided in plural numbers and the light source units may be disposed along the side surface of the light guide plate 150. In this case, plural light incident surfaces exist in the light guide plate. The light guide plate 150 may be formed of a transparent polymer resin such as polycarbonate, polymethylmethacrylate, etc.

The optical sheet 130 is disposed between the light guide plate 150 and the display panel 120 to control the light emitted from the light source unit 160. The optical sheet 130 includes a diffusion sheet 136, a prism sheet 134, and a protective sheet 132, which are sequentially stacked on the light guide plate 150. The diffusion sheet 136 diffuses the light and the prism sheet 134 condenses the diffused light such that the light travels to a direction vertical to the lower surface of the display panel 120. Thus, the light exiting from the prism sheet 134 is substantially vertically incident to the display panel 120. The protective sheet 132 is disposed on the prism sheet 134 to protect the prism sheet 134 from external impacts. In the present exemplary embodiment, one optical sheet 136, one prism sheet 134, and one protective sheet 132 have been shown, but the optical sheet 136, the prism sheet 134, or the protective sheet 132 may be provided in plural numbers or omitted.

The reflective sheet 155 is disposed under the light guide plate 150 to reflect the light, which does not travel to the display panel 120, to the display panel 120. The reflective sheet 155 includes a material that reflects the light. The reflective sheet 155 is disposed on the bottom chassis 180 to reflect the light. As a result, the reflective sheet 155 may increase an amount of the light supplied to the display panel 120.

The light source unit 160 includes a substrate 161 and a plurality of light sources 163. The substrate 161 has a rectangular-plate shape. The substrate 161 has a front surface facing the light incident surface 151A of the light guide plate 150 and being spaced apart from the light incident surface 151A. The light sources 163 are mounted on the front surface of the substrate 161 that is spaced apart from the light guide plate 150. The light sources 163 may be various light sources, such as a point light source, a line light source, a surface light source, etc., but it should not be limited thereto. In the present exemplary embodiment, a light emitting diode (LED) used as a point light source will be described as a representative example. The LED may be provided in plural numbers and arranged in a line along the second direction D2 on the substrate 161.

The supporter 170 is disposed adjacent to the light source unit 160 to support and hold the light source unit 160.

The supporter 170 includes a body part 171, a bottom part 173, a protruding part 175, and a cover part 177.

The body part 171 includes a front surface substantially parallel to the light incident surface 151A and a rear surface opposite to the front surface. The body part 171 is extended in the second direction D2 corresponding to the substrate 161 and the front surface of the body part 171 makes contact with the rear surface of the substrate 161. Although not shown in FIGS. 3 and 4, the rear surface of the body part 171 makes contact with the bottom chassis 180. The body part 171 is provided with a first coupling recess 171S to which the cover part 177 is coupled. In the present exemplary embodiment, the first coupling recess 171S is provided at upper portion of the body part 171, but it should not be limited thereto. That is, the first coupling recess 171S may be provided at a side portion of the body part 171.

The bottom part 173 is extended in the first direction D1 from an end of the body part 171 such that a portion of the bottom part 173 is disposed under the light guide plate 150. The end portion of the bottom part 173 in the first direction D1 is partially overlapped with an end of the light guide plate 150 when viewed in a plan view. An upper surface of the bottom part 173 is provided to be substantially parallel to the light exiting surface 151B to support the light guide plate 150, the optical sheet 130, and the reflective sheet 155.

The protruding part 175 is provided on the bottom part 173 and disposed between the body part 171 and the reflective sheet 155. The protruding part 175 has a wedge shape and is upwardly protruded toward the third direction D3. In addition, the protruding part 175 is extended in the second direction D2. The wedge shape of the protruding part 175 has a substantial triangular shape of which a width of the triangular shape is gradually decreased from the bottom part 173 to the third direction D3 in a cross-sectional view taken along the first direction D1. In this case, the triangular shape may be a right-angled triangular shape including a hypotenuse side facing the substrate 161 of the light source unit 160. The surface of the protruding part 175, which is corresponding to the hypotenuse side, is inclined to the light exiting surface 151B.

The protruding part 175 is extended in the second direction D2 and is provided in a singular form, however it should not be limited thereto. That is, the protruding portion 175 may have a short length such that the protruding portion 175 partially makes contact with the lower portion of the substrate 161. In this case, the protruding part 175 may be provided in a plural number in the second direction D2.

The cover part 177 includes a fixing portion 177C and a first coupling member 177B. The cover part 177 presses the light source unit 160 to the downward direction to prevent the light source unit 160 from being separated in the upward direction.

The fixing portion 177C has a plate-like shape. The fixing portion 177C includes a first portion 177C1 and a second portion 177C2. The first portion 177C1 is substantially parallel to the light exiting surface 151B and covers the upper surface of the body part 171, and the second portion 177C2 is disposed on the upper end of the substrate 161 and bent to the substrate 161, thereby making contact with the upper end of the substrate 161. The second portion 177C2 is inclined to the light exiting surface 151B and the second portion 177C2 and the substrate 161 form an acute angle.

The fixing portion 177C is provided with a second through hole 177S having the same diameter as the first coupling recess 171S.

The fixing portion 177C may be extended in the second direction D2 to cover the whole upper surface of the substrate 161, but is should not be limited thereto. That is, as shown in FIG. 3, the fixing portion 177C may be provided to cover a portion of the upper surface of the substrate 161. In addition, the fixing portion 177C may be provided in a plural number.

The first coupling member 177B may be a screw coupled with the first coupling recess 171S and the second through hole 177S. The first coupling member 177B passes through the second through hole 177S and is coupled with the first coupling recess 171S. The first coupling member 177B allows the cover part 177 to press the substrate 161 to the downward direction in addition to the function of coupling the cover part 177 to the body part 171.

The supporter 170 and the fixing portion 177C may be formed of a metal material having a good elasticity, such as stainless, phosphor bronze, etc., but it should not be limited thereto. Particularly, the fixing portion 177C may be formed of a plastic material having superior elasticity.

According to the backlight assembly BA, the light source unit 160 is firmly fixed to the supporter 170. In other words, the light source unit 160 is disposed between the body part 171 and the protruding part 175. The cover part 177 is disposed on the light source unit 160 and the body part 171 and is coupled with the body part 171 by using the first coupling member 177B. Accordingly, a first force F1 is applied to the substrate 161 from the upward direction to the downward direction (e.g., a reverse direction to the third direction D3). Since the substrate 161 moves downwardly by the first force F1 and the substrate 161 makes contact with the hypotenuse side of the protruding part 175, the first force F1 is converted to a second force F2 operated to a reverse direction to the first direction D1. Thus, the substrate 161 may be firmly fixed to the body part 171 of the supporter 170.

When assuming that an angle between the hypotenuse side of the protruding part 175 and the light exiting surface 151B is theta θ in the cross-sectional view taken along the first direction D1, the angle θ is in a range of about 15 degrees to about 75 degrees. When the angle θ is larger than 75 degrees, the space in which the substrate 161 is fixed to the bottom part 173 is insufficient, and when the angle θ is smaller than 15 degrees, the substrate 161 may not be firmly fixed to the body part 171 because the second force F2 is insufficient.

Hereinafter, various exemplary embodiments will be described and different parts will be mainly described in order to avoid redundancy. In addition, the same parts will be assigned the same reference numerals and detailed description of the same parts will be omitted.

Figure 5:
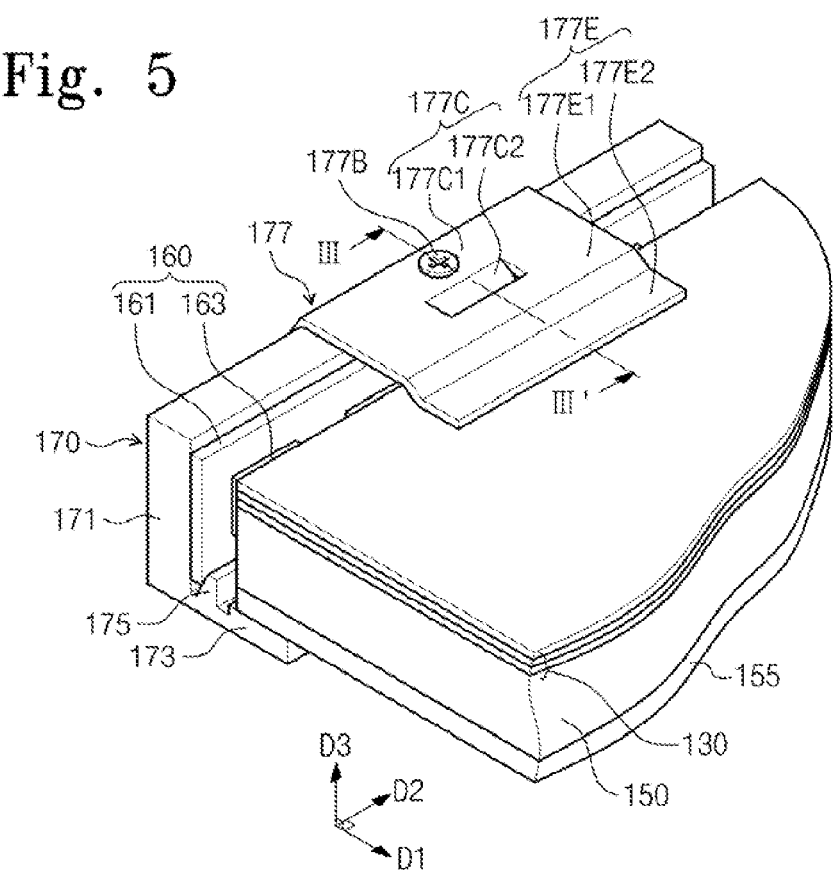
FIG. 5 is a partial perspective view showing a backlight assembly of a display apparatus according to a second exemplary embodiment.
Figure 6:
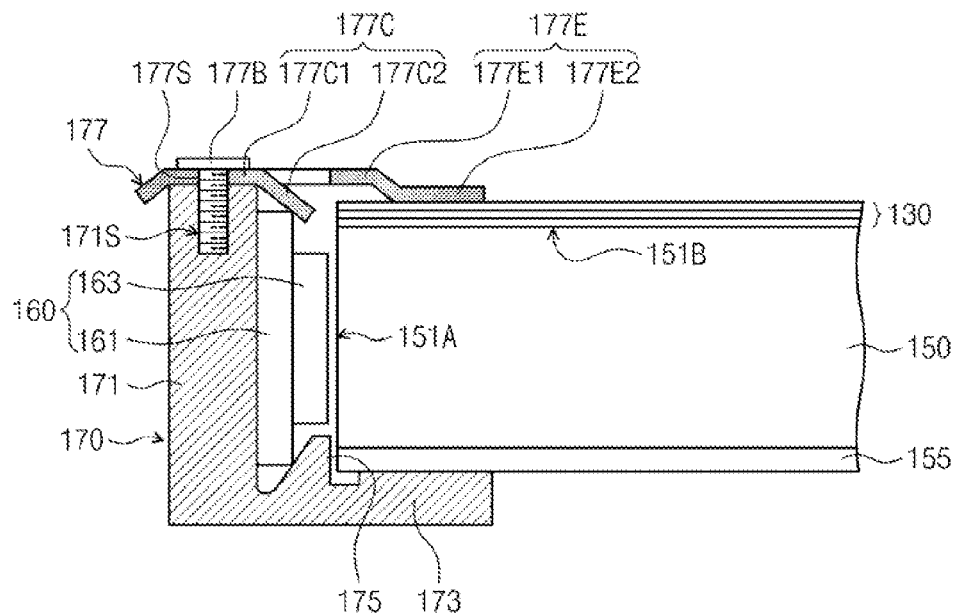
FIG. 6 is a cross-sectional view taken along a line III-III' of FIG. 5.

FIG. 5 is a partial perspective view showing a backlight assembly of a display apparatus according to a second exemplary embodiment, and FIG. 6 is a cross-sectional view taken along a line III-III' of FIG. 5.

Referring to FIGS. 5 and 6, the cover part 177 presses the light source unit 160 and the light guide plate 150 to the downward direction to fix the light source unit 160 and the light guide plate 150 to the supporter 170.

In the second exemplary embodiment, the cover part 177 includes a fixing portion 177C, an extending portion 177E, and a first coupling member 177B.

The fixing portion 177C has a plate-like shape. The fixing portion 177C includes a first portion 177C1 and a second portion 177C2. The first portion 177C1 is substantially parallel to the light exiting surface 151B and covers the upper surface of the body part 171, and the second portion 177C2 is disposed on the upper end of the substrate 161 and bent to the substrate 161, thereby making contact with the upper end of the substrate 161. The second portion 177C2 is inclined to the light exiting surface 151B and the second portion 177C2 and the substrate 161 form an acute angle. The second portion 177C2 of the fixing portion 177C covers the upper end of the substrate 161 and presses the light source unit 160 to the downward direction.

The extending portion 177E has a plate-like shape. The extending portion 177E includes a first portion 177E1 and a second portion 177E2. The first portion 177E1 is substantially parallel to the light exiting surface 151B and covers the upper surface of the body part 171, and the second portion 177E2 is disposed on the upper end of the optical sheet 130 and the light guide plate 150 and bent to the downward direction, thereby making contact with the upper end of the optical sheet 130. The second portion 177E2 is overlapped with an end of the light guide plate 150 in a plan view. The second portion 177E2 of the extending portion 177E presses the upper end of the optical sheet 130 disposed on the light guide plate 150 to the downward direction.

The first portion 177C1 of the fixing portion 177C is connected with the first portion 177E1 of the extending portion 177E in the same horizontal plane as shown in FIG. 5. The fixing portion 177C and the extending portion 177E may be integrally formed with each other, and in this case the fixing portion 177C and the extending portion 177E integrally formed with the fixing portion 177C are extended in the second direction D2. Thus, the fixing portion 177C and the extending portion 177E are provided in a singular form, but it should not be limited thereto. That is, the fixing portion 177C and the extending portion 177E may be provided in a plural number such that the fixing portion 177C and the extending portion 177E partially cover the upper of the substrate 161.

At least one portion of the first portion 177C1 of the fixing portion 177C or the first portion 177E1 of the extending portion 177E is provided with a second through hole 177S having the same diameter as the first coupling recess 171S of the body part 171.

The first coupling member 177B is used to couple the fixing portion 177C and the extending portion 177E to the body part 171. The first coupling member 177B may be a screw coupled to the first coupling recess 171S of the body part 171 and the second through hole 177S formed through the first portion 177C1 of the fixing portion 177C or the first portion 177E1 of the extending portion 177E. The first coupling member 177B is coupled to the first coupling recess 171S after passing through the second through hole 177S.

According to the display apparatus of the second exemplary embodiment, the light source unit 160 and supporter 170 are fixed to each other and the optical sheet 130 and the light guide plate 150 are firmly fixed to the supporter 171. Thus, the optical sheet 130 and the light guide plate 150 may be prevented from sagging.

Figure 7:
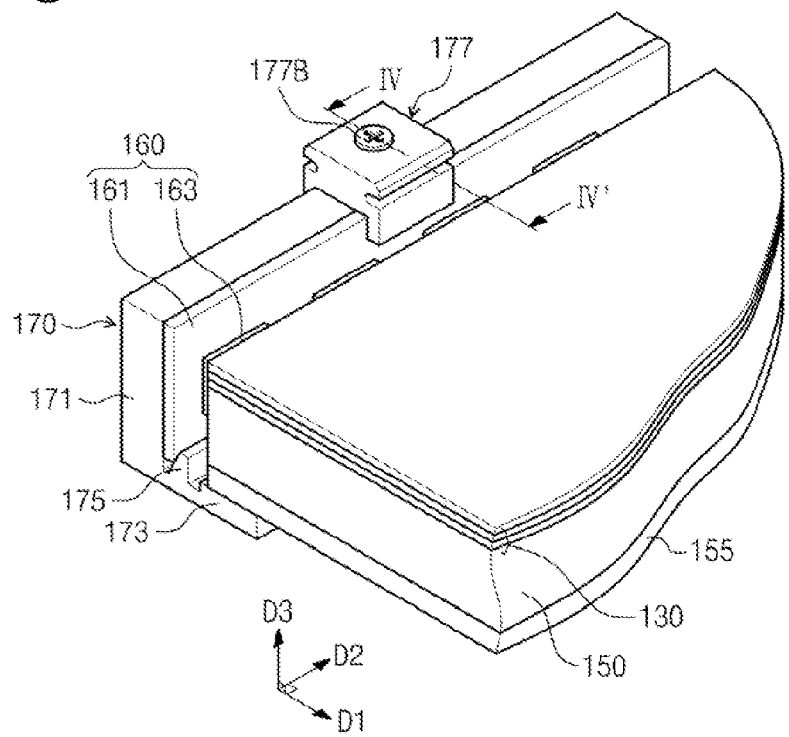
FIG. 7 is a partial perspective view showing a backlight assembly of a display apparatus according to a third exemplary embodiment.
Figure 8:
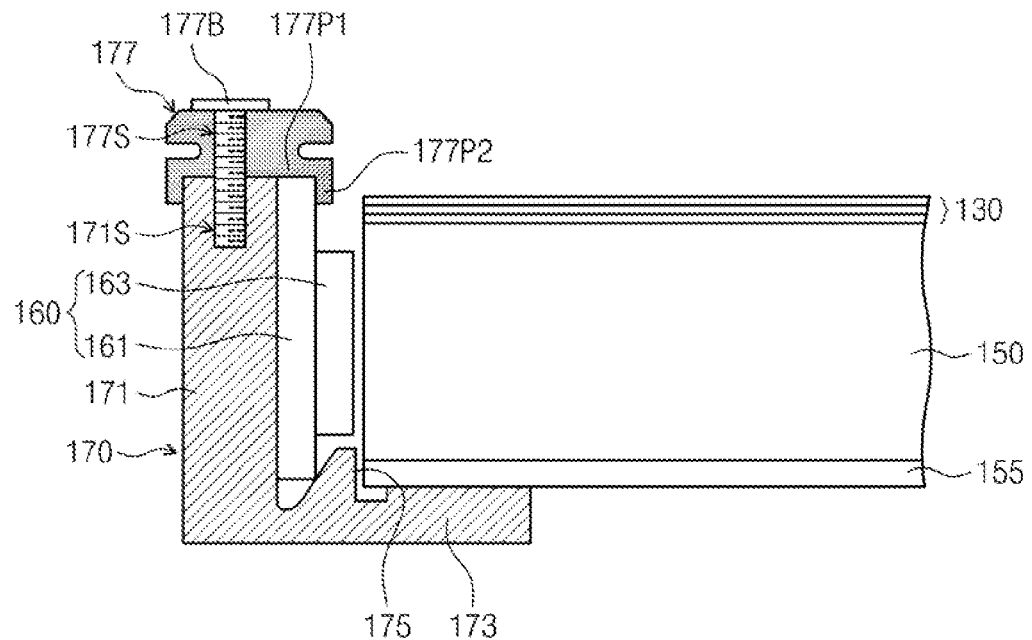
FIG. 8 is a cross-sectional view taken along a IV-IV' of FIG. 7.

FIG. 7 is a partial perspective view showing a backlight assembly of a display apparatus according to a third exemplary embodiment, and FIG. 8 is a cross-sectional view taken along a IV-IV' of FIG. 7.

Referring to FIGS. 7 and 8, the cover part 177 may be formed of a material having elasticity, such as rubber-based material, silicon-based material, or the like, to fix the body part 171 and the substrate 161.

The cover part 177 includes a first portion 177P1 disposed on the body part 171 and the substrate 161, a second portion 177P2 extended in the downward direction from both ends of the first portion 177P1 in the first direction D1, and the first coupling member 177B.

The second portion 177P2 includes a first protrusion protruded from a first end of the first portion 177P1 and a second protrusion protruded from a second end of the first portion 177P1. The first portion 177P1 and the second portion 177P2 are integrally formed with each other. A distance between a lower end of the first protrusion and a lower end of the second protrusion is smaller than a sum of a thickness of the supporter 170 and a thickness of the substrate 161 before the cover part 177 is coupled with the supporter 170 and the substrate 161.

When the cover part 177 is coupled to the supporter 170 and the substrate 161, the lower surface of the first portion 177P1 makes contact with the upper surface of the body part 171 and the upper end of the substrate 161 and the second portion 177P2 makes contact with the rear surface of the body part 171 and the front surface of the substrate 161. Since the distance between the first and second protrusions is smaller than the sum of the thickness of the body part 171 and the thickness of the substrate 161, the first and second protrusions may make contact with the body part 171 and the substrate 161, respectively, by their elasticity, thereby firmly fixing the substrate 161 to the supporter 170.

The first portion 177P1 is provided with the second through hole 177S having the same diameter as the first coupling recess 171S to correspond to the first coupling recess 171S.

The first coupling member 177B may be a screw coupled with the first coupling recess 171S and the second through hole 177S to couple the first portion 177P1 of the cover part 177 to the body part 171. The first coupling member 177B is coupled with the first coupling recess 171S after passing through the second through hole 177S. The first coupling member 177B may press the substrate 161 downward direction by using the first and second portions 177P1 and 177P2 while coupling the first portion 177P1 of the cover part 177 to the body part 171.

According to the third exemplary embodiment, the cover part 177 is formed of the material having elasticity, so assemblability between the supporter 170 and the substrate 161 may be improved. In addition, the first coupling member 177B is provided to couple the first portion 177P1 of the cover part 177 to the supporter 170 and the substrate 161, but it should not be limited thereto. That is, in the case that the supporter 170 and the substrate 161 are sufficiently supported by the elasticity of the cover part 177, the first coupling member 177B will be removed from the display apparatus according to the third exemplary embodiment.

Figure 9:
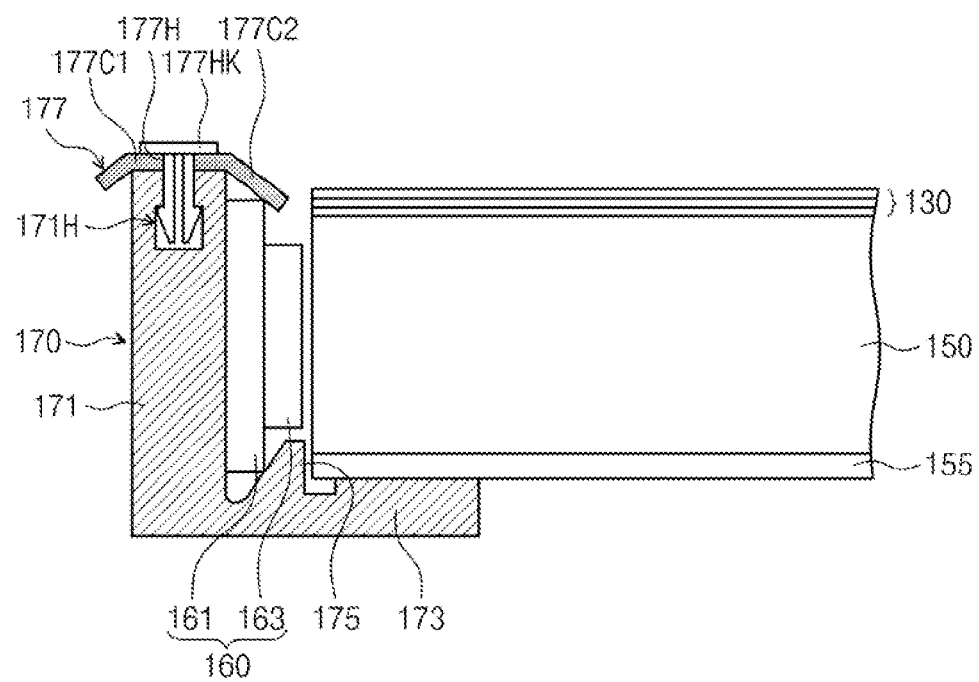
FIG. 9 is a cross-sectional view showing a backlight assembly of a display apparatus according to a fourth exemplary embodiment.
Figure 10:
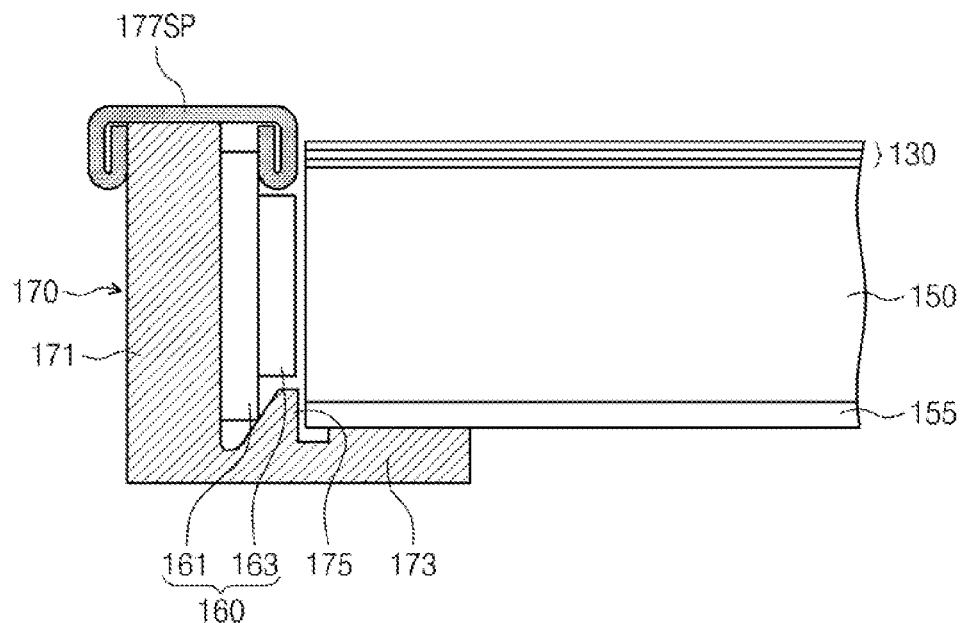
FIG. 10 is a cross-sectional view showing a backlight assembly of a display apparatus according to a fifth exemplary embodiment.

FIG. 9 is a cross-sectional view showing a backlight assembly of a display apparatus according to a fourth exemplary embodiment, and FIG. 10 is a cross-sectional view showing a backlight assembly of a display apparatus according to a fifth exemplary embodiment. In detail, FIG. 9 shows that the cover part 177 is hook-coupled to the body part 171 and FIG. 10 shows that the cover part 177 is coupled to the body part 171 by using a clip.

Referring to FIG. 9, the first coupling member may be a hook 177HK. Thus, the supporter 170 is provided with a first hook hole 171H instead of the first coupling recess 171S and the cover part 177 is provided with a second hook hole 177H instead of the second through hole 177S. The first hook hole 171H is formed by recessing a portion of the upper surface of the body part 171 of the supporter 170 to the downward direction. The second hook hole 177H is formed through the cover part 177. A catching jaw is formed in the first hook hole 171H to prevent the hook 177HK, which is inserted into the first hook hole 171H after passing through the second hook hole 177H, from being separated from the first hook hole 171H. The hook 177HK is inserted into the first hook hole 171H after passing through the second hook hole 177H, so that the body part 171 is coupled with the fixing portion 177C.

Referring to FIG. 10, the first coupling member may be a clip 177SP having elasticity. The clip 177SP should not be limited to a specific shape as long as the clip 177SP may apply forces to the rear surface of the body part 171, the front surface of the substrate 161, and the downward direction. For instance, the first coupling member may have a plate-like shape or a linear shape.

Figure 11:
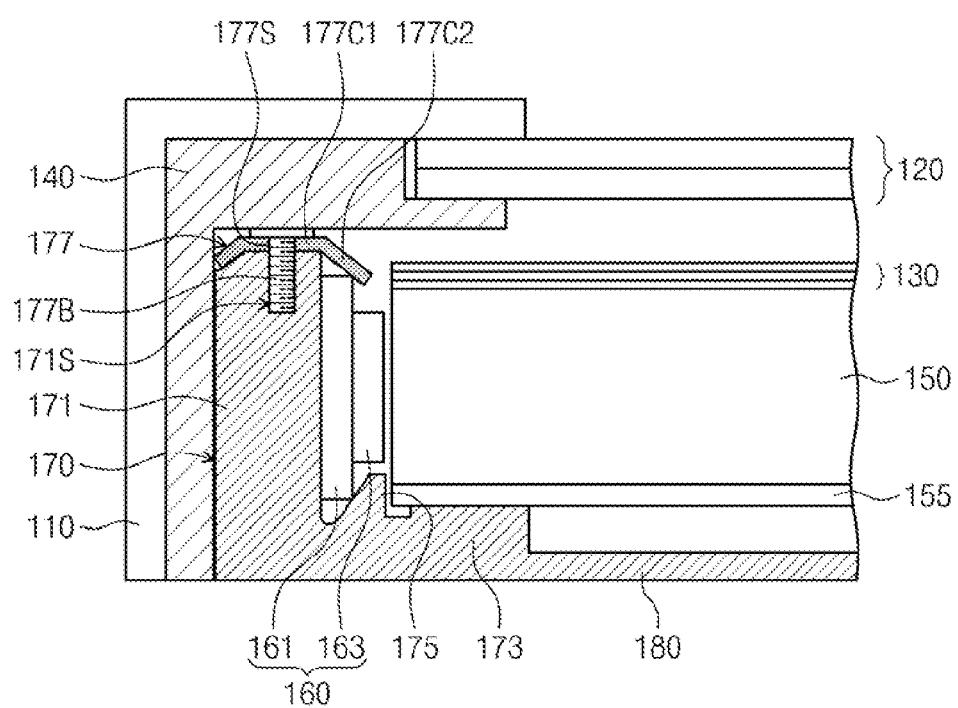
FIG. 11 is a cross-sectional view showing a display apparatus according to a sixth exemplary embodiment.

FIG. 11 is a cross-sectional view showing a display apparatus according to a sixth exemplary embodiment.

Referring to FIG. 11, the supporter 170 is integrally formed with the bottom chassis 180.

The supporter 170 includes the body part 171, the bottom part 173, the protruding part 175, and the cover part 177. The supporter 170 has the same structure and function as the supporter 170 according to the first exemplary embodiment except for the structure that the body part 171, the bottom part 173, and the protruding part 175 are integrally formed with the bottom chassis 180. In addition, the cover part 177 has the same structure and function as the cover part 177 according to the first exemplary embodiment.

Since the supporter 170 is integrally formed with the bottom chassis 180, the supporter 170 and the bottom chassis 180 may be easily manufactured through a single process. In addition, since the supporter 170 may not move in the bottom chassis 180, the light source unit 160 may be stably accommodated in the supporter 170.

Figure 12:
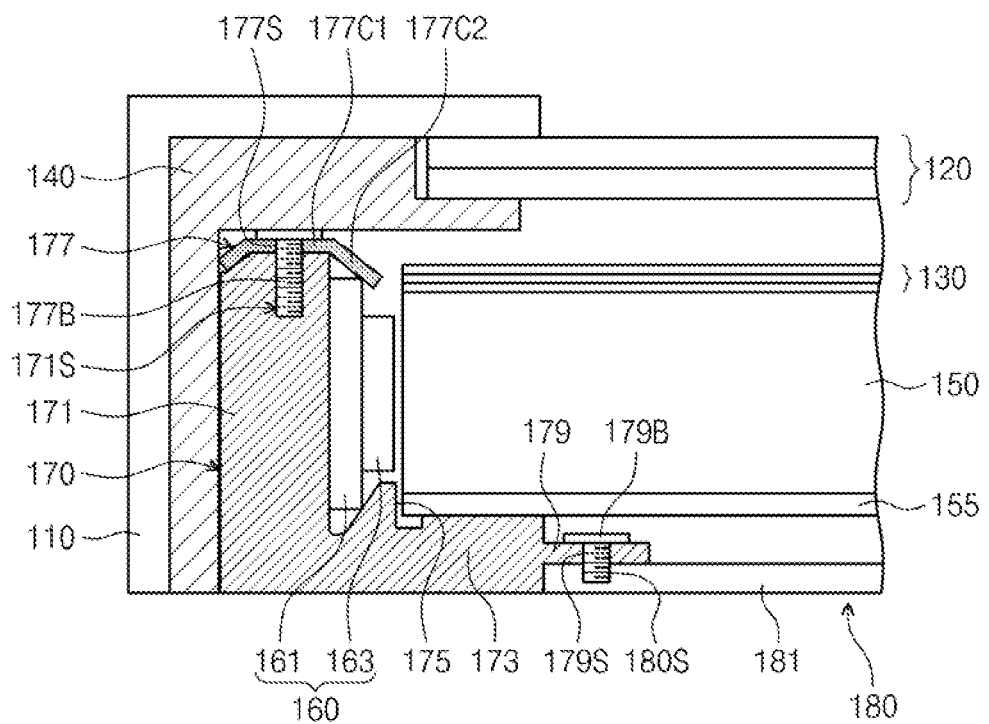
FIG. 12 is a cross-sectional view showing a display apparatus according to a seventh exemplary embodiment.

FIG. 12 is a cross-sectional view showing a display apparatus according to a seventh exemplary embodiment.

Referring to FIG. 12, a bottom chassis 180 includes a bottom portion 181 disposed under the reflective sheet 155 and a sidewall (not shown) extended upwardly from the bottom portion 181. In the present exemplary embodiment, the supporter 170 serves as the sidewall at an end of the bottom portion 181 adjacent to the supporter. The bottom portion 181 is provided with a third coupling recess 180S formed at the end thereof adjacent to the supporter 170.

The light source unit 160, the light guide plate 150, the optical sheet 130, and the reflective sheet 155 are accommodated in the space defined by the bottom portion 181, the sidewall, and the supporter 170.

The supporter 170 includes a body part 171, a bottom part 173, a protruding part 175, a cover part 177, and a coupling part 179.

The body part 171 includes a front surface substantially parallel to the light incident surface 151A and a rear surface opposite to the front surface. The body part 171 is extended in the second direction D2 corresponding to the substrate 161 and the front surface of the body part 171 makes contact with the rear surface of the substrate 161. The rear surface of the body part 171 makes contact with the mold frame 140. The body part 171 is provided with a first coupling recess 171S formed at the upper thereof.

The bottom part 173 is extended from a lower end of the body part 171 such that a portion thereof is disposed under the light guide plate 150 and is substantially parallel to the light exiting surface 151B. When viewed in a plan view, the end of the bottom part 173 in the first direction D1 is overlapped with the end of the light guide plate 150.

The coupling part 179 is provided at the end of the bottom part 173 in the first direction D1. The coupling part 179 is overlapped with the end of the bottom portion 181 of the bottom chassis 180. The coupling part 179 is provided with a fourth through hole 179S having the same diameter as the third coupling recess 180S to correspond to the third coupling recess 180S of the bottom portion 181 of the bottom chassis 180. The bottom chassis 180 and the bottom part 173 are coupled to each other by a second screw 179B that is coupled to the third coupling recess 180S of the bottom chassis 180 after passing through the fourth through hole 179S of the bottom part 173.

The protruding part 175 has the same structure and function as the protruding part 175 according to the first exemplary embodiment, and thus detailed description of the protruding part 175 will be omitted.

The bottom chassis 180 and the supporter 170 may be formed of a metal material having superior elasticity, such as stainless, phosphor bronze, etc.

Figure 13:
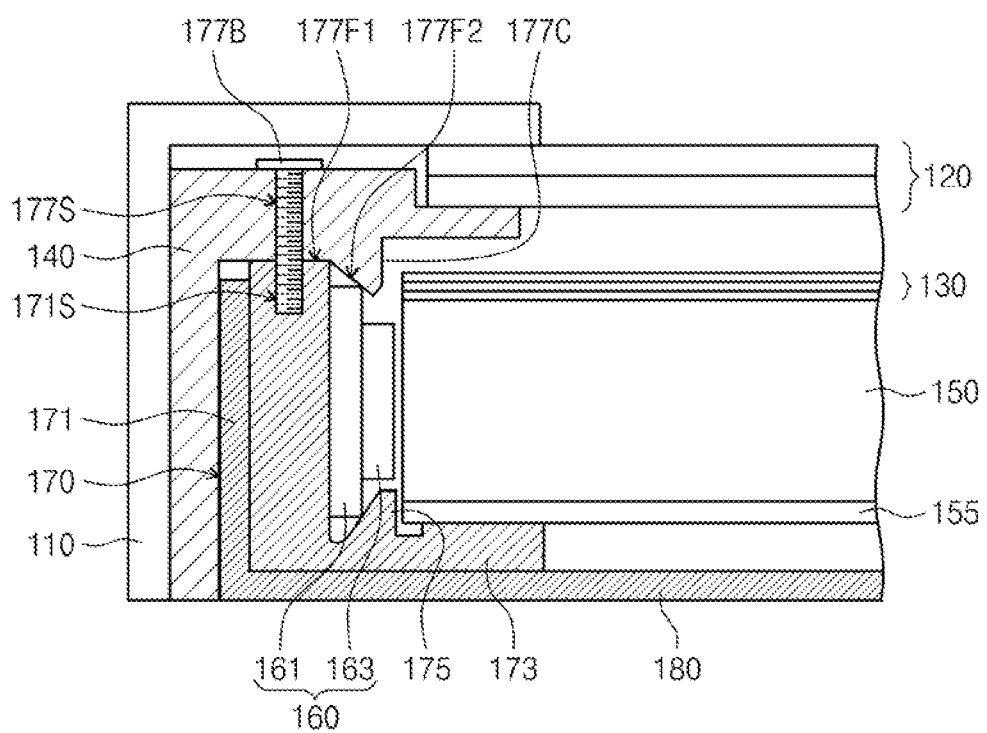
FIG. 13 is a cross-sectional view showing a display apparatus according to an eighth exemplary embodiment.

FIG. 13 is a cross-sectional view showing a display apparatus according to an eighth exemplary embodiment.

Referring to FIG. 13, the mold frame 140 and the supporter 170 may have the structures different from those according to the first exemplary embodiment.

The mold frame 140 is provided along the end of the display panel 120 and disposed below the display panel 120 to support the display panel 120. The mold frame 140 has a substantially rectangular ring shape. The supporter 170 is positioned at a position adjacent to the light source unit 160 to support the light source unit 160.

The supporter 170 includes a body part 171, a bottom part 173, and a protruding part 175. Since the body part 171, the bottom part 173, and the protruding part 175 have the same structure and function as those according to the first exemplary embodiment, detailed descriptions thereof will be omitted.

The mold frame 140 includes a fixing portion 177C and a first coupling member 177B. The cover part 177 presses the light source unit 160 from the upward direction to the downward direction to prevent the light source unit 160 from being separated upwardly.

The fixing portion 177C is protruded from a lower surface of the mold frame 140 and integrally formed with the mold frame 140. The fixing portion 177C includes a first lower surface 177F1 substantially parallel to the light exiting surface 151B to cover the upper surface of the body part 171 and a second lower surface 177F2 bent to the substrate 161 while being extended from the first lower surface 177F1. The second lower surface 177F2 of the fixing portion 177C makes contact with the upper end of the substrate 161. The second lower surface 177F2 is inclined to the light exiting surface 151B and forms an acute angle with the substrate 161 therebetween. The second lower surface 177F2 covers the upper end of the substrate 161 and presses the light source unit 160 to the downward direction.

The mold frame 140 is provided with a second through hole 177S having the same diameter as a first coupling recess 171S of the body part 171 to correspond to the first coupling recess 171S of the body part 171.

The first coupling member 177B may be a screw coupled to the first coupling recess 171S after the second through hole 177S, so that the mold frame 140 may be coupled to the body part 171.

As described above, the display apparatus according to the above-mentioned exemplary embodiments may prevent the light source unit 160 from being distanced from the supporter 170, thereby preventing defects such as light emitting diode of LED.

In addition, the light source unit and the supporter are firmly fixed to each other. Accordingly, heat generated from the light source unit can be easily discharged through the light source unit and the supporter making contact with the light source unit without heat radiation tape or heat radiation grease.

Further, in the case that the light source unit is fixed to the supporter according to the first exemplary embodiment, the distance between the light source unit and the supporter is equal to or less than 0.03 mm.

In addition, according to the above exemplary embodiments, LEDs may be regularly arranged on the substrate, and thus defects, such as dark area, spot, etc., may be prevented. Since the display apparatus does not need the heat radiation tape, the heat radiation grease, additional screw hole, the assembling process for the display apparatus may become simplified and the manufacturing cost for the display apparatus may be reduced.

Although the exemplary embodiments have been described, it is understood that the subject matter described herein should not be limited to these exemplary embodiments but various changes and modifications can be made by one ordinary skilled in the art within the spirit and scope as hereinafter claimed.

What is claimed is:

1. A display apparatus comprising:
a light source unit comprising a substrate and a plurality of light sources arranged on a front surface of the substrate to emit a light;
a supporter supporting the light source unit;
a light guide plate comprising a light incident surface to which the light is incident and a light exiting surface from which the light exits, the light incident surface of the light guide plate facing the front surface of the substrate; and
a display panel receiving the light from the light guide plate to display an image, the supporter comprising:
a body part making contact with a rear surface of the light source unit;
a bottom part extending from a lower portion of the body part to a direction substantially parallel to the light exiting surface;
a protruding part disposed on the bottom part and comprising a surface making contact with the substrate; and
a cover part coupled to the body part to cover an upper portion of the substrate and press the substrate to a direction at which the bottom part is disposed.

2. The display apparatus of claim 1, wherein the surface of the protruding part is inclined to the front surface of the substrate.

3. The display apparatus of claim 2, wherein the protruding part is extended in a longitudinal direction of the substrate.

4. The display apparatus of claim 2, wherein the protruding part is provided in a plural number and the protruding parts are arranged in a longitudinal direction of the substrate.

5. The display apparatus of claim 1, wherein the cover part comprises:
a first portion making contact with an upper portion of the body part;
a second portion extending from the first portion and comprising a surface making contact with the substrate; and
a coupling member coupling the first portion to the body part.

6. The display apparatus of claim 5, wherein the cover part further comprises an extending portion that covers a portion of the light exiting surface to press the light guide plate to the direction at which the bottom part is disposed.

7. The display apparatus of claim 5, wherein the cover part comprises a through hole, the body part comprises a coupling recess, and the coupling member is a screw that is coupled to the coupling recess after passing through the through hole.

8. The display apparatus of claim 5, wherein the cover part comprises a through hole, the body part comprises a coupling recess, and the coupling member is a hook that is coupled to the coupling recess after passing through the through hole.

9. The display apparatus of claim 5, wherein the cover part is a clip that makes contact with a front surface of the light source unit and a rear surface of the body part to press the light source unit to the body part and to press the body part to the light source unit.

10. The display apparatus of claim 9, wherein the cover part comprises:
a first protrusion protruded from the first portion to a downward direction to make contact with a front surface of the light source unit; and
a second protrusion protruded from the first portion to the downward direction to make contact with a rear surface of the body part, the second protrusion facing the first protrusion, the first protrusion presses the light source unit to the second protrusion, and the second protrusion presses the body part to the first protrusion.

11. The display apparatus of claim 5, further comprising a mold frame is provided at at least one side of the supporter to support an end of the display panel.

12. The display apparatus of claim 11, wherein the first portion and the second portion are integrally formed with the mold frame.

13. The display apparatus of claim 12, wherein the mold frame comprises a through hole, the body part comprises a coupling recess, and the coupling member is a screw that is coupled to the coupling recess after passing through the through hole.

14. The display apparatus of claim 1, wherein the supporter is provided in a plural number.

15. The display apparatus of claim 1, further comprising a bottom chassis to accommodate the light source unit, the supporter, and the light guide plate therein.

16. The display apparatus of claim 15, wherein the body part, the bottom part, and the protruding part are integrally formed with the bottom chassis.

17. The display apparatus of claim 15, wherein the bottom part is partially overlapped with the bottom chassis when viewed in a plan view.

18. The display apparatus of claim 17, wherein the bottom part is screw-coupled to the bottom chassis in the overlapped are in which the bottom part is overlapped with the bottom chassis.

19. The display apparatus of claim 15, wherein the supporter and the bottom chassis comprises a metal material.

20. A backlight assembly comprising:
a light source unit comprising a substrate and a plurality of light sources arranged on a front surface of the substrate to emit a light;
a supporter supporting the light source unit; and
a light guide plate comprising a light incident surface to which the light is incident and a light exiting surface from which the light exits, the light incident surface of the light guide plate faces the front surface of the substrate, the supporter comprising:
a body part making contact with a rear surface of the light source unit;
a bottom part extending from a lower portion of the body part to a direction substantially parallel to the light exiting surface;
a protruding part disposed on the bottom part and comprising a surface making contact with the substrate; and
a cover part coupled to the body part to cover an upper portion of the substrate and press the substrate to a direction at which the bottom part is disposed.

* * * * *